US012561284B2

(12) United States Patent
Bai et al.

(10) Patent No.: US 12,561,284 B2
(45) Date of Patent: Feb. 24, 2026

(54) INFORMATION PROCESSING METHOD, ELECTRONIC DEVICE, AND STORAGE MEDIUM

(71) Applicant: Beijing Zitiao Network Technology Co., Ltd., Beijing (CN)

(72) Inventors: Xiaonan Bai, Beijing (CN); Ziyan Li, Beijing (CN); Kun Tong, Beijing (CN); Dapeng Cao, Beijing (CN); Yu Deng, Beijing (CN); Song Wang, Beijing (CN); Xiaojun You, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/709,734

(22) PCT Filed: Nov. 17, 2022

(86) PCT No.: PCT/CN2022/132619
§ 371 (c)(1),
(2) Date: May 13, 2024

(87) PCT Pub. No.: WO2023/088380
PCT Pub. Date: May 25, 2023

(65) Prior Publication Data
US 2025/0013609 A1 Jan. 9, 2025

(30) Foreign Application Priority Data
Nov. 17, 2021 (CN) .......................... 202111362841.3

(51) Int. Cl.
*G06F 17/00* (2019.01)
*G06F 3/0486* (2013.01)
(Continued)

(52) U.S. Cl.
CPC .......... *G06F 16/168* (2019.01); *G06F 3/0486* (2013.01); *G06F 40/197* (2020.01)

(58) Field of Classification Search
CPC ...... G06F 16/168; G06F 16/93; G06F 3/0486; G06F 3/0481; G06F 40/197; G06F 40/169; G06F 40/106; G06Q 10/101
See application file for complete search history.

(56) References Cited

U.S. PATENT DOCUMENTS 8,296,661 B2 * 10/2012 Barrie ................... G06Q 50/00
434/367
2006/0282762 A1 * 12/2006 Diamond .............. G06F 40/169
715/235
(Continued)

FOREIGN PATENT DOCUMENTS

CA       2901630 A1    9/2014
CN     104303157 A    1/2015
(Continued)

OTHER PUBLICATIONS

Rohit Bhiogade et al., AART: AI Assisted Review Tool for Marketing Creatives. In Proceedings of the 3rd ACM India Joint International Conference on Data Science and Management of Data, Association for Computing Machinery, 366-370, <https://doi.org/10.1145/3430984.34309>, Jan (Year: 2021).*
(Continued)

*Primary Examiner* — Greta L Robinson

(57) ABSTRACT

An information processing method and apparatus, an electronic device and a storage medium are provided. The information processing method includes: in response to receiving a file upload operation in a review interface of a first document, acquiring a second document uploaded by a user as an associated document of the first document; and associating at least one associated person of the first document with the second document for enabling the second
(Continued)

document to be reviewed by the at least one associated person, the review interface of the first document being used to display a first content of the first document and a review mark for the first content.

18 Claims, 6 Drawing Sheets

(51) Int. Cl.
  *G06F 16/16*       (2019.01)
  *G06F 40/197*      (2020.01)

(56)                References Cited

U.S. PATENT DOCUMENTS

| | | | |
|---|---|---|---|
| 2009/0265609 A1* | 10/2009 | Rangan | G06F 16/93 |
| | | | 715/234 |
| 2014/0149858 A1* | 5/2014 | Vecera | G06F 40/103 |
| | | | 715/273 |
| 2015/0169614 A1 | 6/2015 | Murali-Venkataraman et al. | |
| 2016/0041961 A1* | 2/2016 | Romney | G06F 40/106 |
| | | | 715/230 |
| 2017/0205965 A1* | 7/2017 | Goel | G06Q 10/103 |
| 2018/0189256 A1* | 7/2018 | Gonzalez | G06F 40/134 |

FOREIGN PATENT DOCUMENTS

| | | |
|---|---|---|
| CN | 105095320 A | 11/2015 |
| CN | 110413971 A | 11/2019 |
| CN | 111401008 A | 7/2020 |
| CN | 111783405 A | 10/2020 |
| CN | 112214971 A | 1/2021 |
| CN | 112632947 A | 4/2021 |
| CN | 113609834 A | 11/2021 |
| CN | 114048706 A | 2/2022 |

OTHER PUBLICATIONS

Pietro Mazzoleni et al., Consultant assistant: a tool for collaborative requirements gathering and business process documentation. In proc. of the 14th ACM SIGPLAN conf. companion on Object oriented programming system. Asso. for Comp. Machinery, 807-808, <https://doi.org/10.1145/1639950.1640025>, Oct (Year: 2009).*
International Search Report and Written Opinion received for PCT Patent Application No. PCT/CN2022/132619, mailed on Jan. 29, 2023, 14 pages (7 pages of English Translation and 7 pages of Original Document).
Office action received from Chinese patent application No. 202111362841.3 mailed on Jul. 12, 2024, 18 pages (9 pages English Translation and 9 pages Original Copy).
Shiyu et al., "Real-time collaborative editing method based on WebSocket and its application", Software Guide Journal, vol. 18, No. 5, May 2019, pp. 1-17.
Office action received from Chinese patent application No. 202111362841.3 mailed on Aug. 19, 2025, 10 pages (5 pages English Translation and 5 pages Original Copy).

* cited by examiner

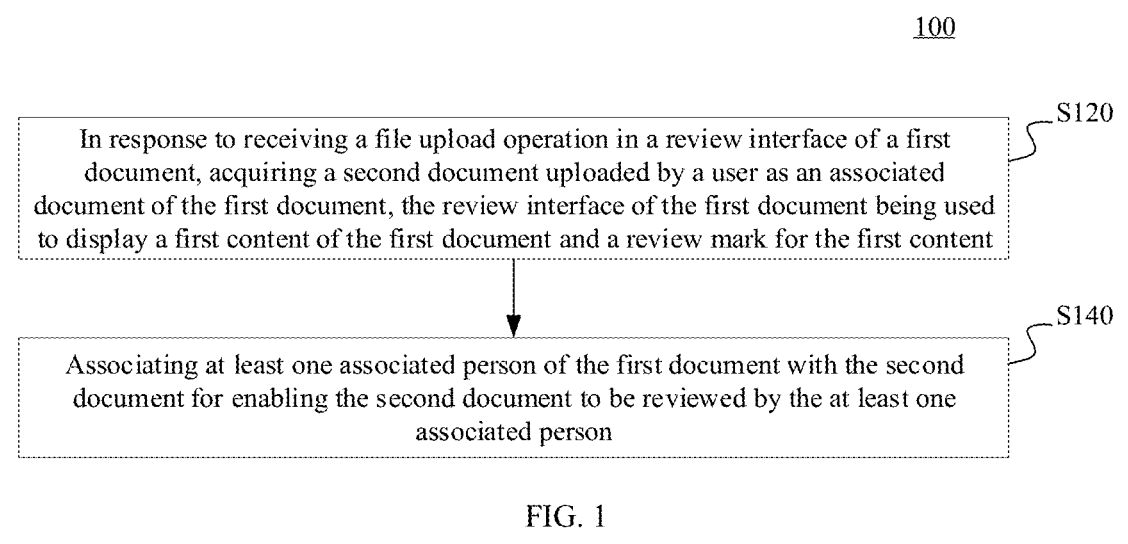

100

S120

In response to receiving a file upload operation in a review interface of a first document, acquiring a second document uploaded by a user as an associated document of the first document, the review interface of the first document being used to display a first content of the first document and a review mark for the first content

S140

Associating at least one associated person of the first document with the second document for enabling the second document to be reviewed by the at least one associated person

FIG. 1

INFORMATION PROCESSING METHOD, ELECTRONIC DEVICE, AND STORAGE MEDIUM

CROSS-REFERENCE TO RELATED APPLICATION

The present disclosure is a U.S. national stage application of International Patent Application No. PCT/CN2022/132619, filed on Nov. 17, 2022, which claims the priority of Chinese Patent Application No. 202111362841.3, filed on Nov. 17, 2021, entitled "Information Processing Method and Apparatus, Electronic Device and Storage Medium", the disclosure of which is incorporated herein by reference in its entirety as part of the present application.

TECHNICAL FIELD

The present disclosure relates to the field of computer technology, and in particular to an information processing method and apparatus, electronic device and storage medium.

BACKGROUND

When a work team draft or revise a transaction document, the document can be processed collaboratively through an online document system, or can be transmitted via email, instant messaging software, document uploading and downloading system, or the like for asynchronous file consultation. However, there is a lack of solutions for collaborative processing of associated documents in the relevant document processing methods.

SUMMARY

The summary section is provided in order to present, in a brief form, the ideas which will be described in detail later in the specific embodiment section. The summary section is not intended to identify key features or essential features of the technical solution for which protection is claimed, nor is it intended to be used to limit the scope of the technical solution for which protection is claimed.

In a first aspect, according to one or more embodiments of the present disclosure, an information processing method is provided, and the information processing method includes:

in response to receiving a file upload operation in a review interface of a first document, acquiring a second document uploaded by a user as an associated document of the first document; and associating at least one associated person of the first document with the second document for enabling the second document to be reviewed by the at least one associated person, the review interface of the first document being used to display a content of the first document and a review mark for the content.

In a second aspect, according to one or more embodiments of the present disclosure, an information processing apparatus is provided, and the information processing apparatus includes:

a document acquisition unit, used to, in response to receiving a file upload operation in a review interface of a first document, acquire a second document uploaded by a user as an associated document of the first document, the review interface of the first document being used to display a content of the first document and a review mark for the content; and an association unit, used to associate at least one associated person of the first document with the second document for enabling the second document to be reviewed by the at least one associated person.

In a third aspect, according to one or more embodiments of the present disclosure, an electronic device is provided, and the electronic device includes: at least one memory and at least one processor, where the memory is configured to store program codes and the processor is configured to call the program codes stored in the memory to cause the electronic device to perform the information processing method according to one or more embodiments of the present disclosure.

In a forth aspect, according to one or more embodiments of the present disclosure, a non-transitory computer storage medium is provided, and the non-transitory computer storage medium stores program codes, and the program codes, upon being executed by a computer device, causes the computer device to perform the information processing method according to one or more embodiments of the present disclosure.

According to one or more embodiments of the present disclosure, by acquiring a second document uploaded by a user as an associated document of the first document in response to receiving a file upload operation in a review interface of a first document, and associating at least one associated person of the first document with the second document for enabling the second document to be reviewed by the at least one associated person, the first document and its associated document can be made available for the associated person of the first document for collaborative processing.

BRIEF DESCRIPTION OF DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

FIG. 1 is a flowchart of an information processing method provided by an embodiment of the present disclosure;

DETAILED DESCRIPTION

Figure 2:
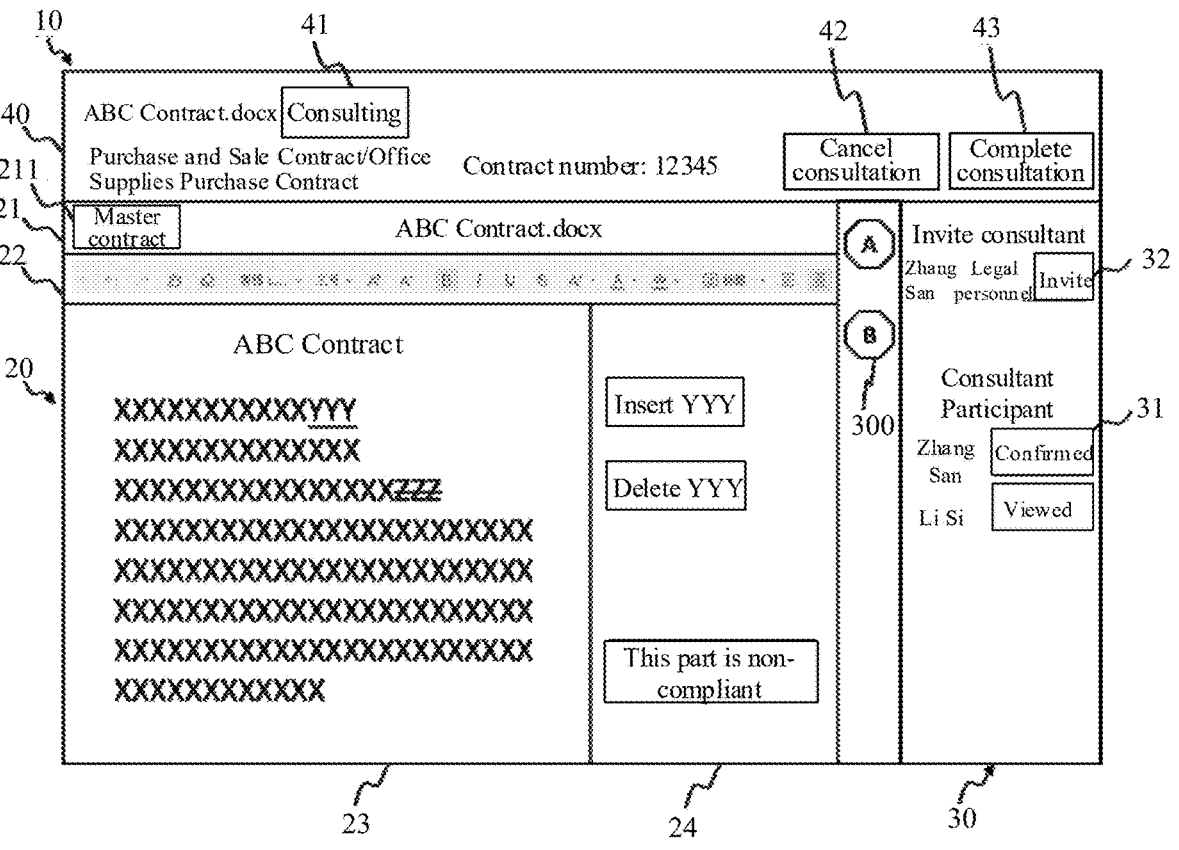
FIG. 2 is a schematic diagram of a review interface of a first document provided by an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps which are omitted or not shown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". The term "in response to" and related terms means that a signal or event is affected by another signal or event to some extent, but not necessarily completely or directly. If event x occurs "in response to" event y, then x may respond directly or indirectly to y. For example, the occurrence of y may eventually lead to the occurrence of x, but there may be other intermediate events and/or conditions. In other cases, y may not necessarily lead to the occurrence of x, and x may occur even if y has not yet occurred. In addition, the term "in response to" may also mean "at least partially in response to".

The term "determine" broadly encompasses a wide variety of actions, which may include acquiring, calculating, computing, processing, deducing, researching, finding (e.g., in a table, database, or other data structure), probing, and the like, as well as receiving (e.g., receiving information), accessing (e.g., accessing data in a memory), and the like, and parsing, selecting, choosing, building, and the like. Related definitions of other terms are given in the description below.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "a/an" and "more" mentioned in the present disclosure are schematic rather than restrictive, and those skilled in the art should understand that unless otherwise explicitly stated in the context, it should be understood as "one or more".

For the purpose of the present disclosure, the phrases "A and/or B" mean (A), (B), or (A and B).

The names of the messages or information interacting between the plurality of apparatuses of the present disclosure are used for an illustrative purpose only and are not intended to limit the scope of the messages or information.

Referring to FIG. 1, FIG. 1 illustrates a flowchart of an information processing method 100 provided by an embodiment of the present disclosure, and the information processing method 100 includes:

S120: in response to receiving a file upload operation in a review interface of a first document, acquiring a second document uploaded by a user as an associated document of the first document, the review interface of the first document being used to display a content of the first document and a review mark for the content.

Exemplarily, a document upload sign may be displayed in the review interface of the first document, and the user may click on the document upload sign and select the second document to be uploaded; alternatively, the review interface of the first document has a preset file drag-and-drop region, and the user may drag-and-drop the second document to the file drag-and-drop region to upload the second document.

In some embodiments, the review mark includes, but is not limited to, a modification mark or a modification trace such as addition, insertion, deletion, or the like to the content of the document, as well as an annotation to the content of the document, etc., and the review mark may be displayed in the content of the document and/or in a preset region of the document.

S140: associating at least one associated person of the first document with the second document for enabling the second document to be reviewed by the at least one associated person.

In some embodiments, the associated person of the first document includes, but is not limited to, a drafter of the first document, a modifier of the first document, or a transaction node executor involved in the transaction processing process associated with the first document. The transaction processing process associated with the first document may include an approval process for the first document, and the transaction node involved in the transaction processing process may include a transaction initiation node, a transaction approval node, and an archiving node. Taking the approval process of the first document as an example, the associated person of the first document may include an initiator, an approver, or an archive personnel of the first document.

According to the information processing method provided in the present disclosure, by acquiring a second document uploaded by a user as an associated document of the first document in response to receiving a file upload operation in a review interface of a first document, and associating at least one associated person of the first document with the second document for enabling the second document to be reviewed by the at least one associated person, the first document and its associated document can be made available for the associated person of the first document for collaborative processing.

Figure 3:
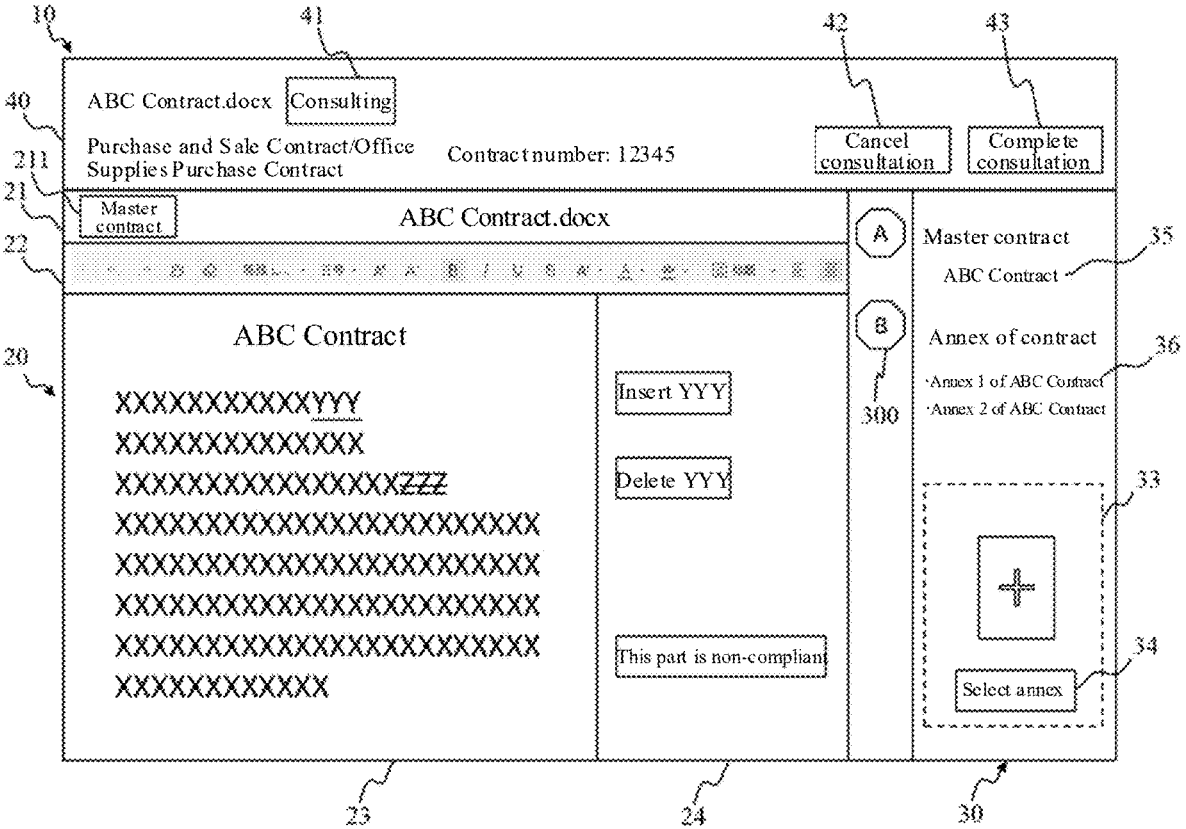
FIG. 3 is a schematic diagram of a review interface of a first document provided by another embodiment of the present disclosure.

FIGS. 2-3 illustrate a review interface of a first document provided by an embodiment of the present disclosure. Referring to FIGS. 2-3, the review interface 10 includes a first document interface 20, an associated information display interface 30, and a title interface 40.

The title interface 40 may display attribute information of the first document, such as title information, type information, and serial number information of the first document. The title interface 40 may also display a processing status sign 41 of the first document, and the status sign 41 may be used to reflect the processing status of the first document, for example, "Consulting", "Collaborative processing", etc. The title interface 40 may also include a sign 42 for cancelling the document review and a sign 43 for ending the document review. Exemplarily, the sign 42 may display the words "Cancel consultation", "Cancel collaborative processing", etc., and the sign 43 may display the words "Complete consultation", "Complete collaborative processing", etc. The user may trigger the sign 42 or the sign 43 to cancel or end the collaborative process or the review process of the first document, respectively.

The first document interface 20 includes a document title interface 21, a toolbar interface 22, a document content interface 23, and an annotation interface 24. The document title interface 21 may display the title information of the first document, as well as the relationship information 211 between the first document and its associated document, and the relationship information may include the master-slave relationship between the first document and the other associated documents, such as "master document", "master contract", "secondary document", "annex," or the like. The document content interface 23 may display the content information of the document itself, such as title, body text, etc. The annotation interface 24 may display an annotation to the document, and the annotation may be generated based on a user modification to the document content or based on a user input.

The associated information display interface 30 may display associated information of the first document, including associated person information of the first document and associated document information of the first document.

Exemplarily, referring to FIG. 2, the associated information display interface 30 shown in FIG. 2 displays associated person information associated with the first document, as well as processing status information 31 of each associated person with respect to the first document. The associated person information may include a sign, a name, company information, department information, or a corresponding transaction processing node, which are of one or more associated persons. The processing status information of the associated person on the first document may include whether the associated person has viewed the first document, or whether the associated person has confirmed the first document, such as "confirmed", "viewed", "not confirmed", "not viewed", etc. The associated person display interface 30 may also display candidate person information and a sign 32 for adding the candidate person as an associated person, the sign may be triggered by the user to add the corresponding candidate person as a formal associated person, and the added associated person has the authorization to view or modify the first document. The candidate person information may include the sign of one or more candidate persons and the corresponding information such as name, unit, department, and the like.

Referring to FIG. 3, FIG. 3 illustrates an associated information display interface 30 for displaying the associated document information of the first document, the associated document information of the first document may include sign, time information, or version information of one or more documents associated with the first document.

Exemplarily, the associated information display interface 30 also displays a file drag-and-drop region 33 and a document upload sign 34. A user can drag-and-drop the second document to the file drag-and-drop region 33 to upload the second document, or, the user may click on the document upload sign 34 and select the second document for uploading.

In some embodiments, the associated information display interface may also display a preset sign 300, and the user may switch the content displayed by the associated information display interface 30 by triggering the preset sign 300. Exemplarily, the user may switch the displayed content of the associated information display interface 30 from the content as shown in FIG. 2 to the content as shown in FIG. 3 by triggering the preset sign 300 as shown in FIG. 2.

In some embodiments, the method 100 further includes:

S150: displaying a sign of the second document in the review interface of the first document; and S160: in response to the sign of the second document being triggered, displaying a review interface of the second document, the review interface of the second document being used to display a content of the second document and a review mark for the content.

In this embodiment, by displaying the sign of the second document in the review interface of the first document, the user can directly access the review interface of the second document within the review interface of the first document, so that the efficiency of reviewing the associated document can be improved.

In some embodiments, the first document review interface includes a first preset region, the first preset region is used to display a sign of the first document. The step S160 further includes: displaying the sign of the second document in a second preset region associated with the first preset region.

In some embodiments, the second preset region is located adjacent to the first preset region.

Referring to FIG. 3, the associated information display interface 30 includes a first preset region 35 and a second preset region 36 which are adjacent to each other, and the second preset region 36 is provided below the first preset region 35. In FIG. 3, the first preset region 36 displays the sign of the first document, "ABC Contract", and the second preset region displays the sign of the documents associated with the first document, including "Annex 1 of ABC Contract" and "Annex 2 of ABC Contract".

In some embodiments, the method 100 further includes:

S170: in response to a preset operation being performed on the associated document of the first document, displaying a preset reminder mark in the review interface of the first document corresponding to the at least one associated person.

Exemplarily, the preset operation includes uploading a new associated document, updating an uploaded associated document, or deleting an uploaded associated document, or commenting on the content of the associated document; and the reminder mark is used to indicate that the content of the annex is changed.

In this embodiment, when any of the associated persons of the first document uploads a new associated document, updates an uploaded associated document, deletes an uploaded associated document, or comments on the content of the associated document, the first document review interfaces corresponding to at least another associated person of the first document display all the preset reminder marks.

In some embodiments, the reminder mark may display information about the person who performs the preset operation on the first document, such as a name, a department, or a corresponding transaction processing node of the person.

Figure 4:
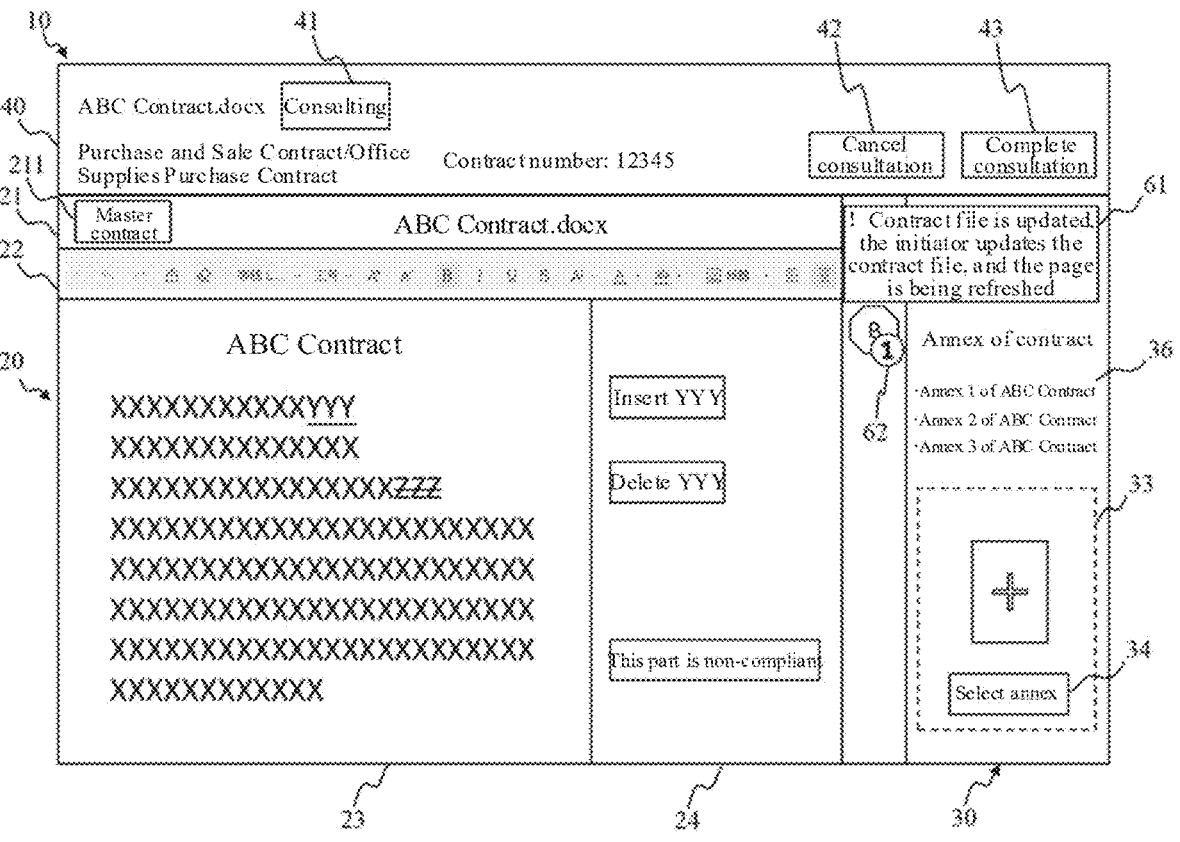
FIG. 4 is a schematic diagram of a review interface of a first document provided by still another embodiment of the present disclosure.

Referring to FIG. 4, when the initiator of the first document uploads the document "Annex 3 of ABC Contract" as an associated document of the first document "ABC Contract", the review interface 10 of the first document of another associated person of the first document displays preset reminder marks 61 and 62, or only reminder mark 62. With reference to FIG. 4, the reminder mark 61 displays a text prompt information such as "Contract file is updated, the initiator updates the contract file, and the page is being refreshed". The reminder marker 62 displays a numeric mark "①" to prompt the number of associated documents that is updated. The second preset region 36 may display the newly uploaded document, "Annex 3 of ABC Contract".

In some embodiments, the reminder mark may also be displayed at the associated position of the annex name or the annex sign in the annex display region, and with reference to FIGS. 3-4, a dotted mark is displayed in front of the annex name or annex sign 36. In some embodiments, the annex name or the annex sign may also be highlighted.

In some embodiments, a separate update region may also be set in the annex display region, and the annex with changed content is placed in the update region to remind the user to view.

In some embodiments, referring to FIG. 4, when the preset operation shows to deleting the uploaded associated document, a reminder mark 62 is displayed in the associated region of the annex display region in the review interface 10. When the preset operation does not include deleting the uploaded associated document, a reminder mark is displayed at the associated position of the annex name or the annex sign in the annex display region. Because it is impossible to locate the name or sign of the annex when the annex is deleted, it is necessary to reminder at other positions.

In some embodiments, the method 100 further includes:

S180: refreshing the review interface of the first document in response to a preset operation being performed on an associated document of the first document.

In some embodiments, the method 100 further includes:

S190: after an associated person of the second document performs a first operation on the second document, saving an operation trace of the first operation and a corresponding version of the second document.

In some embodiments, the first operation includes a revision operation and a comment operation, and the operation trace includes the information of the user who performs the first operation and an operation content of the first operation.

In some embodiments, the review interface of the first document is associated with a third preset region, and the third preset region is used to display the history version information of the first document and the history version information of the second document. Exemplarily, the history version information includes the version information of the document as well as corresponding upload time information and upload user information.

In some embodiments, the third preset region includes a first level display information and a second level display information. The first level display information includes an sign and a file name of the first document or the second document, and the second level display information includes the history version information of the first document or the second document.

It should be noted that the third preset region may be located within the first document review interface, and may also be accessed or opened via the first document review interface, which is not limited in the present disclosure.

Figure 5:
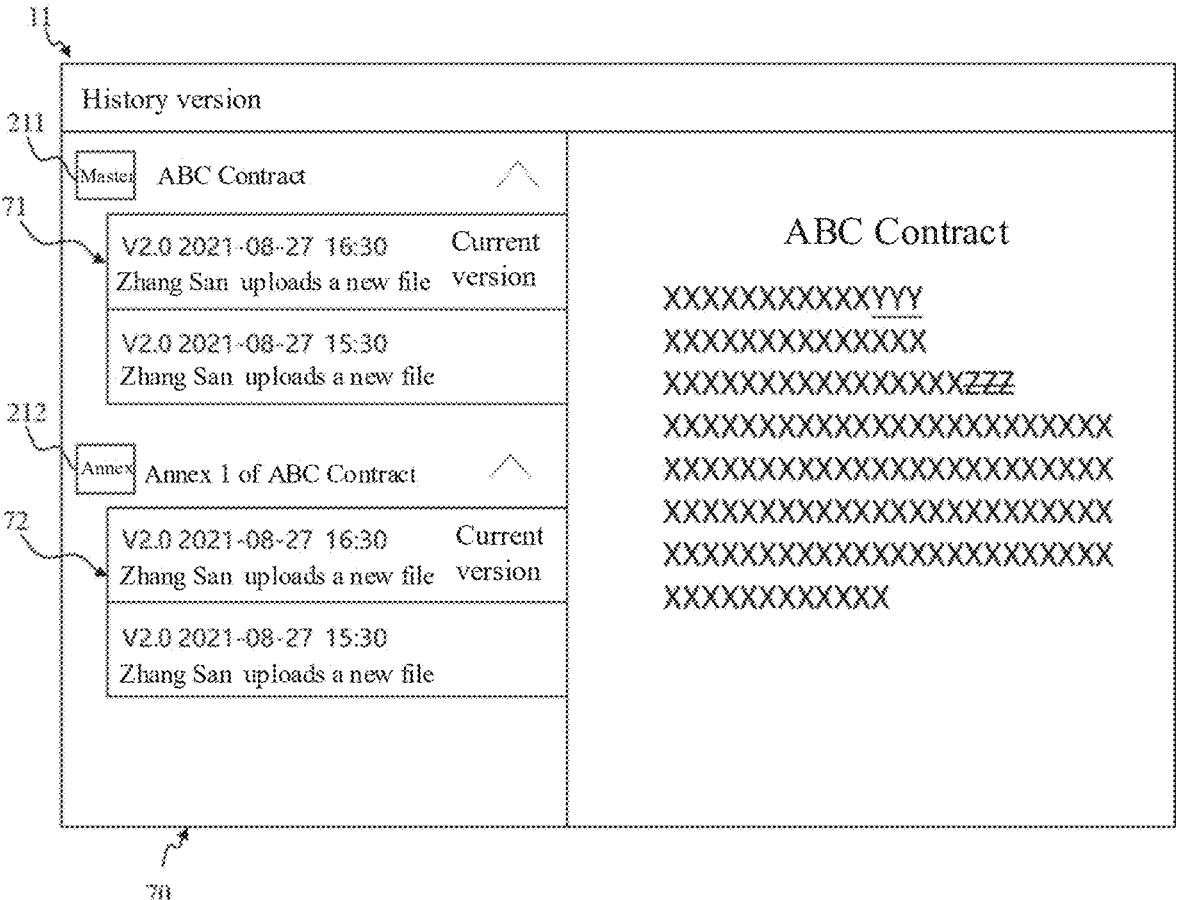
FIG. 5 is a schematic diagram of a review interface of a first document provided by yet another embodiment of the present disclosure.

Referring to FIG. 5, the review interface 11 of the first document includes a third preset region 70. A master document sign 211 for reflecting the relationship between the first document and its associated document, a slave document sign 212 for reflecting the relationship between the associated documents and the first document, a history version information 71 of the first document, and a history version information 72 of the second document are displayed in the third preset region 70.

In some embodiments, the history version information of the first document and the history version information of the second document may be displayed in an expanded form or in a contracted form in the third preset region.

In some embodiments, a comparison operation is received in the third preset region to compare the history version information of the documents. After the comparison operation is received, a selection control is generated in the region of the history version information, and after any two pieces of the history version information are selected, the comparison result is displayed.

In some embodiments, in the comparison process, when selecting the history version information, it is determined whether the selected history version information belongs to the same first document, or it is determined whether the selected history version information belongs to the same second document, and when it belongs to the same first document or the second document, the comparison result is displayed, or otherwise, the comparison is rejected.

In some embodiments, in the comparison process, when selecting the history version information, when a history version information is selected, the document to which the history version information belongs is determined, and the selection control corresponding to the history version information of documents other than the determined document is set to a non-selectable state.

In some embodiments, when the comparison operation is received, the file format of each history version information is determined. When the file format is a preset format, the selection control is generated in the region of the history version information; when the file format is not a preset format, the history version information is set to a non-selectable state.

It is to be noted that FIGS. 2-5 illustrate a review interface of the first document provided according to one or more embodiments, however, a person skilled in the art can understand that, without contradiction, the review interface of the second document may include the same or corresponding contents or functions as the review interface of the first document, for example, the review interface of the second document may display information related to the first document, including but not limited to the sign of the first document, the associated person information of the first document, and the history version information of the first document.

The following description is made with an example of contract reviewing.

According to one or more embodiments of the present disclosure, a user may upload one or more annexes of the contract in a review interface of the master contract to have the annexes of the contract reviewed together by a reviewer of the master contract. The review interface of the master contract is used to display a contract content of the master contract and a review mark for the contract content.

After the annex of the contract is uploaded, the review interface of the master contract may display the contract sign of the master contract and the contract sign of the one or more annexes of the contract. The user may trigger the contract sign of the annex of the contract to access the review interface of the annex of the contract.

During the review process of the master contract, the user can update or delete the uploaded annex of the contract or upload new annex of the contract, and then the system may trigger an unread prompt to inform the reviewer that the relevant annex of the contract is updated, uploaded or deleted.

The modification marks and the corresponding version information of the master contract and the annex of the contract are retained during the reviewing process so that the reviewing process of the master contract and its annex of the contract can be viewed and traced back.

Figure 6:
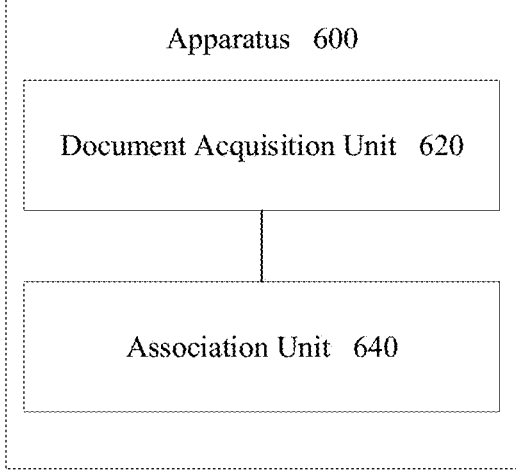
FIG. 6 is a structural schematic diagram of an information processing apparatus provided by an embodiment of the present disclosure.

Accordingly, as shown in FIG. 6, an information processing apparatus 600 is provided by an embodiment of the present disclosure, including:

a document acquisition unit 620 configured to, in response to receiving a file upload operation in a review interface of a first document, acquire a second document uploaded by a user as an associated document of the first document, the review interface of the first document being used to display a content of the first document and a review mark for the content; and an association unit 640 configured to associate at least one associated person of the first document with the second document for enabling the second document to be reviewed by the at least one associated person.

According to one or more embodiments of the present disclosure, by acquiring a second document uploaded by a user as an associated document of the first document in response to receiving a file upload operation in a review interface of a first document, and associating at least one associated person of the first document with the second document for enabling the second document to be reviewed by the at least one associated person, the first document and its associated document can be made available for the associated person of the first document for collaborative processing.

In some embodiments, the information processing apparatus further includes:

an sign display unit configured to display an sign of the second document in the review interface of the first document, and in response to the sign of the second document being triggered, display a review interface of the second document, the review interface of the second document being used to display a content of the second document and a review mark for the content.

According to one or more embodiments of the present disclosure, the review interface of the first document includes a first preset region, the first preset region is used to display a sign of the first document; the sign display unit is further used to display the sign of the second document in a second preset region associated with the first preset region.

According to one or more embodiments of the present disclosure, the second preset region is located adjacent to the first preset region.

In some embodiments, the information processing apparatus further includes:

a reminder unit configured to, in response to a preset operation being performed on the associated document of the first document, display a preset reminder mark in the review interface of the first document corresponding to the at least one associated person.

According to one or more embodiments of the present disclosure, the preset operation includes an upload operation, an update operation, a comment operation or a deletion operation of the associated document.

In some embodiments, the information processing apparatus further includes:

a saving unit configured to save an operation trace of the first operation and a corresponding version of the second document after an associated person of the second document performs a first operation on the second document.

According to one or more embodiments of the present disclosure, the first operation includes a revision operation and a comment operation, and the operation trace includes information of a user who performs the first operation and an operation content of the first operation.

According to one or more embodiments of the present disclosure, the review interface of the first document is associated with a third preset region, and the third preset region is used to display history version information of the first document and history version information of the second document.

According to one or more embodiments of the present disclosure, the review interface of the first document includes a first sign, and the file upload operation includes a triggering operation on the first sign displayed in the review interface of the first document; or the review interface of the first document includes a first region, and the file upload operation includes an operation of dragging and dropping a file to the first region.

As for the apparatus embodiment, because it basically corresponds to the method embodiment, it is sufficient to refer to the partial description of the method embodiment for relevant details. The above-described apparatus embodiment is merely schematic, in which the modules described as separate modules may or may not be separate. Some or all of these modules may be selected according to actual needs to achieve the purpose of the embodiment scheme. It can be understood and implemented without creative labor by a person of ordinary skill in the art.

Correspondingly, according to one or more embodiments of the present disclosure, an electronic device is provided, and the electronic device includes:

at least one memory and at least one processor, and the memory is used to store program codes and the processor is used to call the program codes stored in the memory to cause the electronic device to perform the information processing method according to one or more embodiments of the present disclosure.

Correspondingly, according to one or more embodiments of the present disclosure, a non-transitory computer storage medium is provided, and the non-transitory computer storage medium stores program codes, and the program codes, upon being executed by a computer device, causes the computer device to perform the information processing method according to one or more embodiments of the present disclosure.

Figure 7:
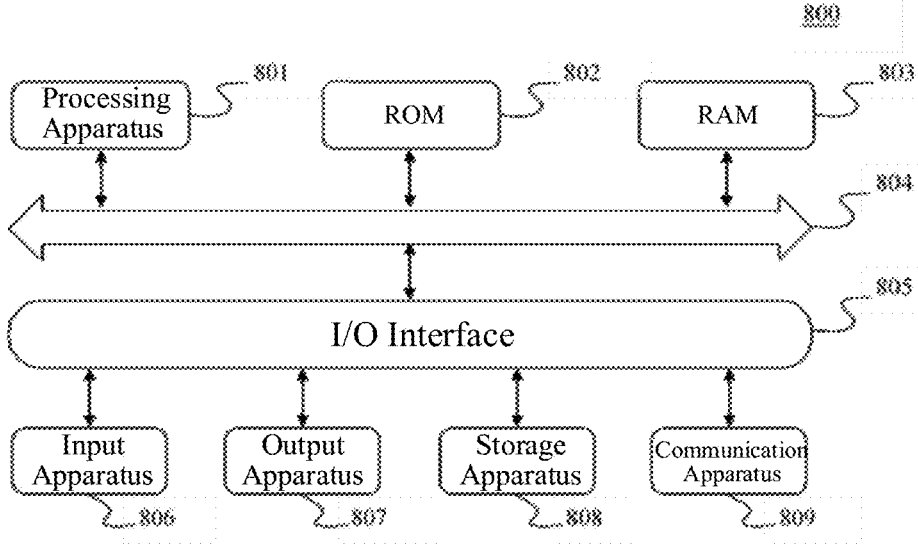
FIG. 7 is a structural schematic diagram of an electronic device provided by an embodiment of the present disclosure.

FIG. 7 is referred to below, and it shows the structural schematic diagram suitable for achieving the electronic device (e.g., a terminal device or a server) 800 in the embodiment of the present disclosure. The electronic device in the embodiment of the present disclosure may include but not be limited to a mobile terminal such as a mobile phone, a notebook computer, a digital broadcasting receiver, a personal digital assistant (PDA), a portable android device (PAD), a portable multimedia player (PMP), a vehicle terminal (such as a vehicle navigation terminal), and a fixed terminal such as a digital television (TV) and a desktop computer. The electronic device shown in FIG. 7 is only an example and should not impose any limitations on the functions and use scopes of the embodiments of the present disclosure.

As shown in FIG. 7, the electronic device 800 may include a processing apparatus (such as a central processing unit, and a graphics processor) 801, it may execute various appropriate actions and processes according to a program stored in a read-only memory (ROM) 802 or a program loaded from a storage apparatus 808 to a random access memory (RAM) 803. In RAM 803, various programs and data required for operations of the electronic device 800 are also stored. The processing apparatus 801, ROM 802, and RAM 803 are connected to each other by a bus 804. An input/output (I/O) interface 805 is also connected to the bus 804.

Typically, the following apparatuses may be connected to the I/O interface 805: an input apparatus 806 such as a touch screen, a touchpad, a keyboard, a mouse, a camera, a microphone, an accelerometer, and a gyroscope; an output apparatus 807 such as a liquid crystal display (LCD), a loudspeaker, and a vibrator; a storage apparatus 808 such as a magnetic tape, and a hard disk drive; and a communication apparatus 809. The communication apparatus 809 may allow the electronic device 800 to wireless-communicate or wire-communicate with other devices so as to exchange data. Although FIG. 7 shows the electronic device 800 with various apparatuses, it should be understood that it is not required to implement or possess all the apparatuses shown. Alternatively, it may implement or possess the more or less apparatuses.

Specifically, according to the embodiment of the present disclosure, the process described above with reference to the flowchart may be achieved as a computer software program. For example, an embodiment of the present disclosure includes a computer program product, it includes a computer program loaded on a non-transitory computer-readable medium, and the computer program includes a program code for executing the method shown in the flowchart. In such an embodiment, the computer program may be downloaded and installed from the network by the communication apparatus 809, or installed from the storage apparatus 808, or installed from ROM 802. When the computer program is executed by the processing apparatus 801, the above functions defined in the method in the embodiments of the present disclosure are executed The above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More examples of the computer-readable storage medium may include but not be limited to: an electric connector with one or more wires, a portable computer magnetic disk, a hard disk drive, a RAM, a ROM, an erasable programmable read-only memory (EPROM or flash memory), an optical fiber, a compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt a plurality of forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a Hypertext Transfer Protocol (HTTP), and may interconnect with any form or medium of digital data communication (such as a communication network). Examples of the communication network include a local area network (LAN), a wide area network (WAN), an internet work (such as the Internet), and an end-to-end network (such as an ad hoc end-to-end network), as well as any currently known or future-developed networks.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to perform the above method provided by the present disclosure.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including local area network (LAN) or wide area network (WAN), or may be connected to an external computer (such as connected by using an internet service provider through the Internet).

The flowcharts and the block diagrams in the drawings show possibly achieved system architectures, functions, and operations of systems, methods, and computer program products according to various embodiments of the present disclosure. At this point, each box in the flowchart or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flowchart, as well as combinations of the boxes in the block diagram and/or the flowchart, may be achieved by using a dedicated hardware-based system that performs the specified function or operation, or may be achieved by using combinations of dedicated hardware and computer instructions.

The units involved in the embodiments of the present disclosure may be implemented in software or hardware. The name of the unit does not constitute a limitation of the unit itself under certain circumstances.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard part (ASSP), a system on chip (SOC), a complex programmable logic device (CPLD) and the like.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, an information processing method is provided, and the information processing method includes: in response to receiving a file upload operation in a review interface of a first document, acquiring a second document uploaded by a user as an associated document of the first document; and associating at least one associated person of the first document with the second document for enabling the second document to be reviewed by the at least one associated person, the review interface of the first document being used to display a content of the first document and a review mark for the content.

The information processing method according to one or more embodiments provided in the present disclosure, further including: displaying a sign of the second document in the review interface of the first document; and in response to the sign of the second document being triggered, displaying a review interface of the second document, the review interface of the second document being used to display a content of the second document and a review mark for the content.

According to one or more embodiments of the present disclosure, the review interface of the first document has a first preset region, the first preset region is used to display a sign of the first document; and the displaying a sign of the second document in the review interface of the first document, includes: displaying the sign of the second document in a second preset region associated with the first preset region.

According to one or more embodiments of the present disclosure, the second preset region is located adjacent to the first preset region.

The information processing method according to one or more embodiments of the present disclosure, further including: in response to a preset operation being performed on the associated document of the first document, displaying a preset reminder mark in the review interface of the first document corresponding to the at least one associated person.

According to one or more embodiments of the present disclosure, the preset operation includes an upload operation, an update operation, a comment operation or a deletion operation of the associated document.

According to one or more embodiments of the present disclosure, after an associated person of the second document performs a first operation on the second document, an operation trace of the first operation and a corresponding version of the second document are saved.

According to one or more embodiments of the present disclosure, the first operation includes a revision operation and a comment operation, and the operation trace includes information of a user who performs the first operation and an operation content of the first operation.

According to one or more embodiments of the present disclosure, the review interface of the first document is associated with a third preset region, and the third preset region is used to display history version information of the first document and history version information of the second document.

According to one or more embodiments of the present disclosure, the review interface of the first document has a first sign, and the file upload operation includes a triggering operation on the first sign displayed in the review interface of the first document; or the review interface of the first document has a first region, and the file upload operation includes an operation of dragging and dropping a file to the first region.

According to one or more embodiments of the present disclosure, an information processing apparatus is provided, and the information processing apparatus includes: a document acquisition unit, used to, in response to receiving a file upload operation in a review interface of a first document, acquire a second document uploaded by a user as an associated document of the first document, the review interface of the first document being used to display a content of the first document and a review mark for the content; and an association unit, used to associate at least one associated person of the first document with the second document for enabling the second document to be reviewed by the at least one associated person.

According to one or more embodiments of the present disclosure, an electronic device is provided, and the electronic device includes: at least one memory and at least one processor, where the memory is used to store program codes and the processor is used to call the program codes stored in the memory to cause the electronic device to perform the information processing method according to one or more embodiments of the present disclosure.

According to one or more embodiments of the present disclosure, a non-transitory computer storage medium is provided, and the non-transitory computer storage medium stores program codes, and the program codes, upon being executed by a computer device, causes the computer device to perform the information processing method according to one or more embodiments of the present disclosure.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. An information processing method performed by a processor, comprising:

in response to receiving a file upload operation in a review interface of a first document, acquiring a second document uploaded by a user as an associated document of the first document, wherein relationship information between the first document and the second document comprises a master-slave relationship; and acquiring at least one associated person authorized to view or modify the first document, associating the at least one associated person of the first document with the second document for enabling the second document to be reviewed by the at least one associated person, wherein the review interface of the first document is used to display a first content of the first document and a review mark for the first content;

the method further comprising:

in response to a preset operation being performed on the associated document of the first document, displaying a preset reminder mark in the review interface of the first document corresponding to the at least one associated person.

2. The information processing method according to claim 1, further comprising:

displaying a sign of the second document in the review interface of the first document; and in response to the sign of the second document being triggered, displaying a review interface of the second document, wherein the review interface of the second document is used to display a second content of the second document and a review mark for the second content.

3. The information processing method according to claim 1, wherein the review interface of the first document comprises a first preset region, the first preset region is used to display a sign of the first document; and the displaying a sign of the second document in the review interface of the first document, comprises:

displaying the sign of the second document in a second preset region associated with the first preset region.

4. The information processing method according to claim 3, wherein the second preset region is located adjacent to the first preset region.

5. The information processing method according to claim 1, wherein the preset operation comprises at least one of following: an upload operation, an update operation, a comment operation or a deletion operation of the associated document.

6. The information processing method according to claim 1, wherein after an associated person of the second document performs a first operation on the second document, an operation trace of the first operation and a corresponding version of the second document are saved.

7. The information processing method according to claim 6, wherein the first operation comprises a revision operation and a comment operation, and the operation trace comprises information of a user who performs the first operation and an operation content of the first operation.

8. The information processing method according to claim 1, wherein the review interface of the first document is associated with a third preset region, and the third preset region is used to display history version information of the first document and history version information of the second document.

9. The information processing method according to claim 1, wherein the review interface of the first document comprises a first sign, and the file upload operation comprises a triggering operation on the first sign displayed in the review interface of the first document; or the review interface of the first document comprises a first region, and the file upload operation comprises an operation of dragging and dropping a file to the first region.

10. An electronic device, comprising:

at least one memory and at least one processor, wherein the memory is used to store program codes and the processor is used to call the program codes stored in the memory to cause the electronic device to perform an information processing method, and the method comprises:

in response to receiving a file upload operation in a review interface of a first document, acquiring a second document uploaded by a user as an associated document of the first document, wherein relationship information between the first document and the second document comprises a master-slave relationship; and acquiring at least one associated person authorized to view or modify the first document, associating the at least one associated person of the first document with the second document for enabling the second document to be reviewed by the at least one associated person, wherein the review interface of the first document is used to display a first content of the first document and a review mark for the first content, and the method further comprises:

in response to a preset operation being performed on the associated document of the first document, displaying a preset reminder mark in the review interface of the first document corresponding to the at least one associated person.

11. The electronic device according to claim 10, wherein the method further comprises:

displaying a sign of the second document in the review interface of the first document; and in response to the sign of the second document being triggered, displaying a review interface of the second document, wherein the review interface of the second document is used to display a second content of the second document and a review mark for the second content.

12. The electronic device according to claim 10, wherein the review interface of the first document comprises a first preset region, the first preset region is used to display a sign of the first document; and the displaying a sign of the second document in the review interface of the first document, comprises:

displaying the sign of the second document in a second preset region associated with the first preset region.

13. The electronic device according to claim 12, wherein the second preset region is located adjacent to the first preset region.

14. The electronic device according to claim 10, wherein the preset operation comprises at least one of following: an upload operation, an update operation, a comment operation or a deletion operation of the associated document.

15. The electronic device according to claim 10, wherein after an associated person of the second document performs a first operation on the second document, an operation trace of the first operation and a corresponding version of the second document are saved.

16. The electronic device according to claim 15, wherein the first operation comprises a revision operation and a comment operation, and the operation trace comprises information of a user who performs the first operation and an operation content of the first operation.

17. The electronic device according to claim 10, wherein the review interface of the first document is associated with a third preset region, and the third preset region is used to display history version information of the first document and history version information of the second document.

18. A non-transitory computer storage medium, wherein the non-transitory computer storage medium stores program codes, and the program codes, upon being executed by a computer device, causes the computer device to perform an information processing method, and the method comprises:

in response to receiving a file upload operation in a review interface of a first document, acquiring a second document uploaded by a user as an associated document of the first document, wherein relationship information between the first document and the second document comprises a master-slave relationship; and acquiring at least one associated person authorized to view or modify the first document, associating the at least one associated person of the first document with the second document for enabling the second document to be reviewed by the at least one associated person, wherein the review interface of the first document is used to display a first content of the first document and a review mark for the first content, and the method further comprises:

in response to a preset operation being performed on the associated document of the first document, displaying a preset reminder mark in the review interface of the first document corresponding to the at least one associated person.

\* \* \* \* \*